United States Patent
Shen et al.

(10) Patent No.: US 9,788,077 B1
(45) Date of Patent: Oct. 10, 2017

(54) RENDITION SWITCHING

(71) Applicant: Amazon Technologies, Inc., Seattle, WA (US)

(72) Inventors: Yueshi Shen, Cupertino, CA (US); Jorge Arturo Villatoro, San Francisco, CA (US); Matthew Louis Szatmary, Walnut Creek, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/075,074

(22) Filed: Mar. 18, 2016

(51) Int. Cl.
*H04N 7/173* (2011.01)
*H04N 21/647* (2011.01)
*H04N 21/6379* (2011.01)
*H04N 21/438* (2011.01)

(52) U.S. Cl.
CPC ....... *H04N 21/647* (2013.01); *H04N 21/4382* (2013.01); *H04N 21/6379* (2013.01)

(58) Field of Classification Search
CPC ............. H04N 21/4382; H04N 21/647; H04N 21/6379
USPC ........................................................ 725/90
See application file for complete search history.

(56) References Cited

U.S. PATENT DOCUMENTS

| | | | |
|---|---|---|---|
| 2004/0001547 A1* | 1/2004 | Mukherjee | H04N 19/51 375/240.16 |
| 2006/0233247 A1* | 10/2006 | Visharam | G11B 27/3027 375/240.12 |
| 2008/0273094 A1* | 11/2008 | Kunieda | H04N 1/2112 348/220.1 |
| 2013/0089142 A1* | 4/2013 | Begen | H04N 21/23424 375/240.12 |
| 2016/0330453 A1* | 11/2016 | Zhang | H04N 19/154 |

* cited by examiner

*Primary Examiner* — Kyu Chae
(74) *Attorney, Agent, or Firm* — Baker & Hostetler LLP

(57) ABSTRACT

Techniques for improved rendition switching in association with adaptive bitrate streaming are described herein. The disclosed techniques may allow switching between segments at P-frames in addition to IDR-frames. By allowing switching at P-frames, the disclosed techniques may improve efficiency by, for example, reducing end-to-end latency without causing an undesirable decrease in image quality and image fidelity. In some examples, switching to a lower image quality rendition (e.g., lower bitrate, lower resolution, etc.) may be accomplished using P-frame switching, IDR-frame switching or both. Also, in some examples, switching to a higher image quality rendition (e.g., higher bitrate, higher resolution, etc.) may be accomplished using only IDR-frame switching.

20 Claims, 8 Drawing Sheets

RENDITION SWITCHING

BACKGROUND

The transmission and presentation of information using streaming delivery technology is rapidly increasing. Various forms of streaming technology and, in particular, hypertext transfer protocol (HTTP) streaming, may employ adaptive bitrate streaming, in which a video stream is encoded using multiple renditions that may differ with respect to various transmission attributes (e.g., bitrates, resolutions, profiles, frame rates, etc.). A recipient may then determine which rendition to download depending on various transmission characteristics, such as network conditions (e.g., available network bandwidth, throughput, etc.), computational resources (e.g., recipient processor usage, recipient memory usage, etc.), decoder compatibility, and others. In adaptive bitrate streaming, video streams are encoded into small segments (typically 2-10 seconds), and each segment starts with an instantaneous decoder refresh frame (IDR-frame). An IDR-frame is a special intra-coded picture frame (I-frame) that flushes all reference pictures in the DPB (decoded picture buffer), so that no following video frames can reference any picture prior to the IDR-frame. This means that each segment is self-decodable (i.e., doesn't depend on reference pictures in previous segments). Also, segments of different renditions are perfectly time aligned (i.e., for segments of different renditions, the presentation timestamp (PTS) of the first frames as well as the durations are exactly same). Therefore, the recipient can switch from one rendition to another seamlessly.

One challenge related to adaptive bitrate streaming is the desire to reduce end-to-end latency while maintaining a sufficiently high video quality. In adaptive bitrate streaming, larger segment durations may tend to increase latency. Thus, one simple technique for reducing latency involves the reduction of segment duration. However, the reduction of segment duration may result in more frequent transmission of IDR-frames, which have large data sizes and are expensive and inefficient to encode. Thus, while reduction of segment duration may reduce latency, a resulting increased frequency of IDR-frames may result in negative effects, such as decreased image quality and image fidelity.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
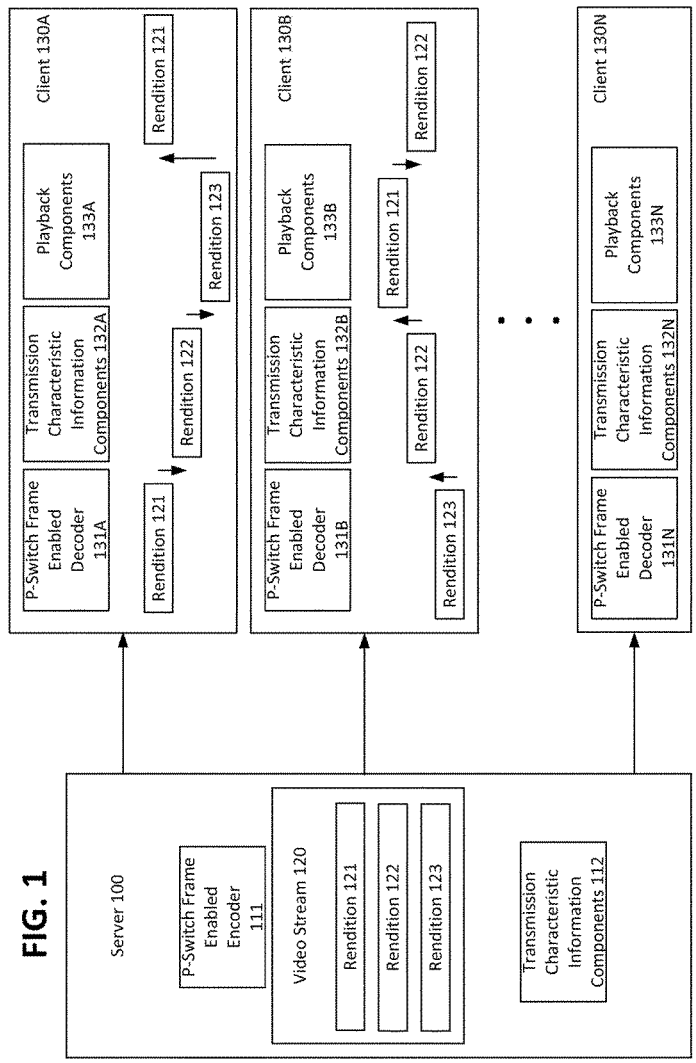
FIG. 1 is a diagram illustrating an example system for improved rendition switching for adaptive bitrate streaming that may be used in accordance with the present disclosure.

Techniques for improved rendition switching in association with adaptive bitrate streaming are described herein. As set forth above, in conventional adaptive bitrate streaming, switching between different renditions may occur only at instantaneous decoder refresh frames (IDR-frames) that initiate each segment. By contrast, in addition to IDR-frames, the disclosed techniques may also allow switching between segments at predictive frames (P-frames). By allowing switching at P-frames, the disclosed techniques may improve efficiency by, for example, reducing end-to-end latency without causing an undesirable decrease in image quality and image fidelity. Additionally, in some cases, switching at P-frames may allow more frequent switching, which may enable switching to become more responsive to changes in transmission characteristics.

In some examples, rendition switching at P-frames may be employed only when switching to a lower image quality rendition (e.g., lower bitrate, lower resolution, etc.), which may sometimes be referred to as switching down. Also, in some examples, rendition switching at IDR-frames may be employed when switching down to a lower image quality rendition and/or when switching to a higher image quality rendition (e.g., higher bitrate, higher resolution, etc.), which may sometimes be referred to as switching up. Thus, in some examples, switching down may be accomplished using P-frame switching, IDR-frame switching or both. By contrast, in some examples, switching up may be accomplished using only IDR-frame switching. In some cases, switching down at P-frames and/or IDR-frames and switching up only at IDR-frames may provide a number of advantages. For example, in some cases, switching down at P-frames may allow reduction of end-to-end latency as well and more frequent and responsive switching when transmission characteristics are becoming less favorable. In some cases, however, such as when a next IDR-frame is closer than (e.g., will be transmitted and/or received prior to) a next P-frame, it may still be more beneficial to switch down at an IDR-frame. By contrast, in some cases, switching up may be accomplished using only IDR-frame switching because, for example, IDR-frames may allow the recipient to continue to benefit from the clean switching characteristics of IDR-frames when transmission characteristics are becoming more favorable.

In some examples, not all P-frames may support rendition switching. For example, in some cases, a special type of P-frame (referred to hereinafter as a P-switch frame) may be designated as a P-frame that supports rendition switching. By contrast, other P-frames (referred to hereinafter as non-switch P-frames) may not support rendition switching. In some examples, to allow for efficient rendition switching, a P-switch frame may differ from non-switch P-frames based on various characteristics. For example, in some cases, while non-switch P-frames may sometimes be generated based on motion information from references frames, a P-switch frame may be prohibited from being generated based on motion information from its reference frames. This is because the reference frames for a P-switch frame are included in a different rendition than the P-switch frame, and their motion information may, therefore, be invalid and may cause distortion if applied to the P-switch frame. Another characteristic of P-switch frames is that they may also be generated by predicting pixel information from reference frames having higher resolutions. Thus, for example, generation of P-switch frames may sometimes include downscaling of pixel information from reference frames of higher resolution. By contrast, non-switch P-frames may be generated by predicting pixel information from reference frames of the same resolution, and scaling may therefore not be advantageous for generation of non-switch P-frames.

FIG. 1 is a diagram illustrating an example system for improved rendition switching for adaptive bitrate streaming that may be used in accordance with the present disclosure. As shown in FIG. 1 a transmitter 100 (e.g., one or more servers) encodes a video stream 120, for delivery to recipients 130A-N (e.g., clients) over one or more networks, for example a local area network (LAN) and/or a wide area network (WAN) such as the Internet. The video stream 120 may be transmitted from transmitter 100 and received and presented by recipients 130A-N using streaming technology, in which a collection of information may be presented by a recipient while also being transmitted to the recipient. For example, a prior portion of video stream 120 may be presented by a recipient at the same time that a subsequent portion of the video stream 120 is still being transmitted to the recipient. In some examples, the encoded and transmitted image information may correspond to a live or nearly-live (e.g., short time delay) transmission of an event, such as a playing of a video game, a news conference, a sporting event, and many others. A live or nearly-live transmission of an event that is delivered using streaming technology may often be referred to as live-streaming. It is noted however, that the transmission of information depicted in FIG. 1 is not limited to live or nearly-live transmission and may also include transmission of prior recorded events, media, or other information. In some examples, video stream 120 may be transmitted to recipients 130A-N as part of a large-scale video broadcast, in which video stream 120 is broadcast to a large quantity of recipients 130A-N. It is noted however, that the rendition switching techniques disclosed herein are not limited to large-scale video broadcasts and may also be employed for smaller-scale video broadcasts or even for video stream transmissions to a single recipient.

In the example of FIG. 1, transmitter 100 includes a P-switch frame enabled encoder 111 for encoding of video stream 120 for transmission to recipients 130A-N. Additionally, recipients 130A-N each include a respective P-switch frame enabled decoder 131A-N for decoding of video stream 120. Recipients 130A-N also include respective playback components 133A-N for playback of the transmitted video stream, such as media players, web browsers, and other playback components. In some examples, decoders 131A-N may be wholly or partially included within or integrated with respective playback components 133A-N. In some examples, video stream 120 may be transmitted using a communications protocol that is commonly employed for adaptive bitrate streaming, such as hypertext transfer protocol (HTTP). As set forth above, one characteristic of adaptive bitrate streaming is that a transmitted video stream may be encoded using a number of different renditions, which may each differ from one another with respect to one or more image quality-related attributes, such as bitrates, resolutions, profiles, frame rates, and others. As shown in FIG. 1, encoder 111 encodes video stream 120 using multiple renditions 121-123. Although the particular example of FIG. 1 depicts three renditions 121-123, it is noted that the rendition switching techniques disclosed herein may be employed with respect to any number of two or more renditions. In some examples, renditions 121-123 may each differ from one another with respect to one or more image quality-related attributes, such as the examples identified above. In one particular example, renditions 121-123 may differ from one another with respect to their respective resolutions. For example, rendition 121 may be a high-quality rendition that has a higher resolution than renditions 122 and 123. Rendition 122 may be a mid-quality rendition that has a lower resolution than rendition 121 and a higher resolution than rendition 123. Rendition 123 may be a low-quality rendition that has a lower resolution than renditions 121 and 122.

As also described above, another characteristic of adaptive bitrate streaming is that a particular one of the multiple available renditions 121-123 may be selected for each recipient 130A-N. Additionally, during the course of the video transmission, each recipient 130A-N may switch between renditions, sometimes frequently, based on various factors. In some examples, the selection and switching of renditions may be based on various transmission characteristics, such as network conditions (e.g., available network bandwidth, throughput, etc.), computational resources (e.g., recipient processor usage, recipient memory usage, etc.), decoder compatibility, and others. In some examples, different transmission characteristics may exist with respect to transmission of video stream 120 for different recipients 130A-N. For example, a network connection between transmitter 100 and recipient 130A may be experiencing favorable conditions, while a network connection between transmitter 100 and recipient 130B may simultaneously be experiencing poor conditions. Additionally, network conditions for each particular recipient 130A-N may also change over time during the course the transmission of video stream 120. For example, at the start of transmission of video stream 120, a network connection between transmitter 100 and recipient 130A may be experiencing favorable conditions, but these conditions may sometimes change, in some cases very quickly, and become less favorable, such as based on other network communications usages or for other reasons. Other transmission characteristics may also experience various changes for each recipient 130A-N during the course of a video broadcast or other transmission.

As shown in FIG. 1, some examples of rendition selection and switching are depicted for recipients 130A and 130B. For example, FIG. 1 shows that recipient 130A initiates the transmission of video stream 120 by receiving high-quality rendition 121 (as shown by rendition 121 being the first rendition listed within the respective box for recipient 130A). In some examples, high-quality rendition 121 may be selected for recipient 130A based on recipient 130A experiencing favorable transmission characteristics, such as a high available network bandwidth and/or low central processing unit (CPU) usage. However, as shown in FIG. 1, after receiving a first portion of the video transmission using rendition 121, recipient 130A switches down to receive mid-quality rendition 122 (as shown by the downward arrow pointing from first rendition 121 to second rendition 122).

This switching down to mid-quality rendition 122 may be caused, for example, by a downgrade of transmission characteristics, such as a reduction in available network bandwidth and/or an increase in CPU usage. Recipient 130A again switches down from mid-quality rendition to 122 to low-quality rendition 123, for example based on a further downgrade in transmission characteristics. Recipient 130B then switches back up from rendition 123 to rendition 121, for example based on an upgrade in transmission characteristics.

As also shown in FIG. 1, recipient 130B initiates the transmission of video stream 120 by receiving low-quality rendition 123 (as shown by rendition 123 being the first rendition listed within the respective box for recipient 130B). In some examples, low-quality rendition 123 may be selected for recipient 130B based on recipient 130B experiencing unfavorable transmission characteristics, such as a low available network bandwidth and/or high CPU usage. However, as shown in FIG. 1, after receiving a first portion of the video transmission using rendition 123, recipient 130B switches up to receive mid-quality rendition 122 (as shown by the upward arrow pointing from first rendition 123 to second rendition 122). This switching up to mid-quality rendition 122 may be caused, for example, by an upgrade of transmission characteristics, such as an increase in available network bandwidth and/or a decrease in CPU usage. Recipient 130B again switches up from mid-quality rendition to 122 to high-quality rendition 121, for example based on a further upgrade in transmission characteristics. Recipient 130B then switches back down from rendition 121 to rendition 122 for example based on a downgrade in transmission characteristics.

In the example of FIG. 1, each of recipients 130A-N includes a respective transmission characteristic information component 132A-N, while transmitter 100 includes a transmission characteristic information component 112. Generally, components 132A-N and 112 may cooperate to obtain, receive, process, and update information associated with transmission characteristics. For example, in some cases, components 132A may monitor CPU usage and other computational resources on recipient 130A in order to determine computational resources that are used and/or available on recipient 130A. As another example, components 132A may operate alone and/or in combination with components 112 to determine available network bandwidth and other network conditions for communications between transmitter 100 and recipient 130A. Transmission characteristic information component 132A-N and 112 may then communicate and interact with decoders 131A-N and/or encoder 111 in order to allow selection and switching of renditions 121-123 for recipients 130A-N.

As set forth above, in conventional adaptive bitrate streaming techniques, video streams are encoded into segments, and each segment starts with an IDR-frame. Additionally, in conventional adaptive bitrate streaming techniques, switching between renditions is permitted only at IDR-frames (i.e., at the initiation of a segment). As also set forth above, in adaptive bitrate streaming, larger segment durations may tend to increase end-to-end latency. However, the reduction of segment durations requires more frequent transmission of IDR-frames, which have large data sizes and are expensive and inefficient to encode. Thus, while reduction of segment duration may reduce latency, the resulting increased frequency of IDR-frames may result in negative effects, such as decreased image quality and image fidelity. For these and other reasons, the disclosed techniques may allow switching between renditions at P-frames in addition to IDR-frames. By allowing switching at P-frames, the disclosed techniques may improve efficiency by, for example, reducing end-to-end latency without causing an undesirable decrease in image quality and image fidelity. Additionally, in some cases, switching at P-frames may allow more frequent switching, which may enable switching to become more responsive to changes in transmission characteristics. Thus, P-switch frame enabled encoder 111 and P-switch frame enabled decoders 131A-N may allow switching between renditions at P-frames as will be described in detail below.

Figure 2:
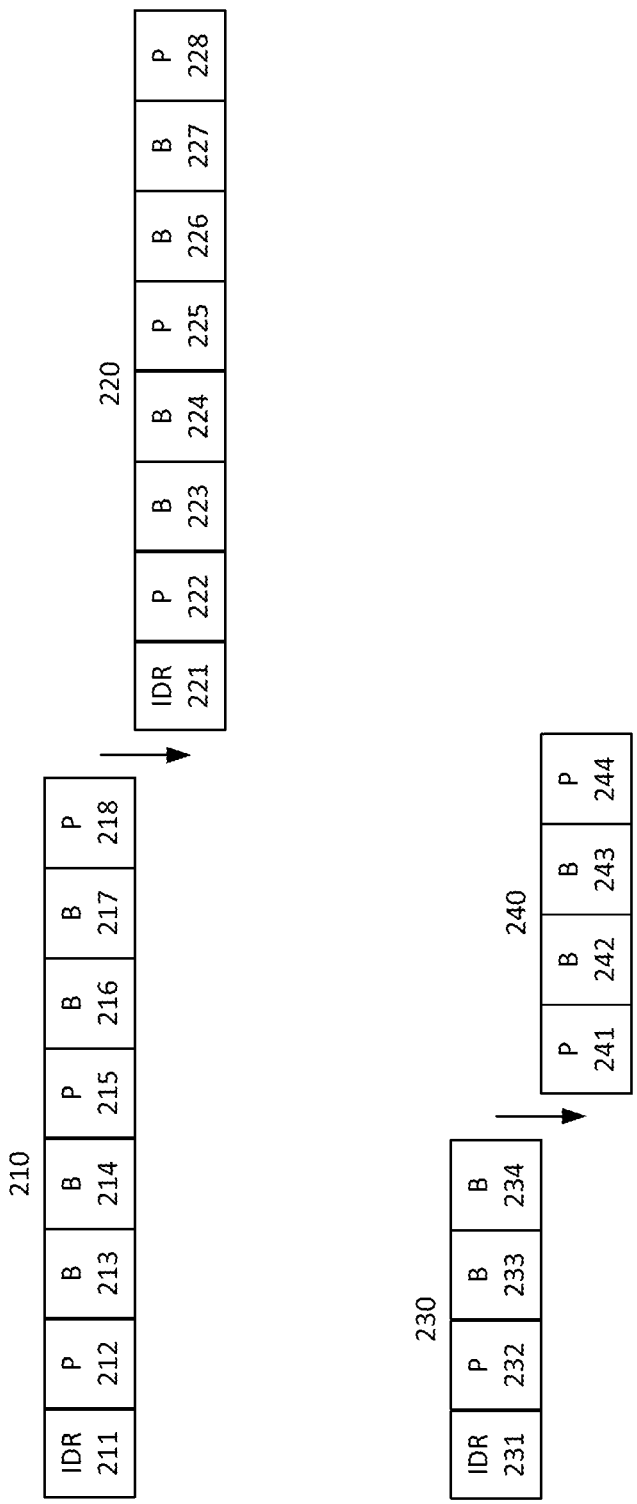
FIG. 2 is a diagram illustrating example IDR-frame and P-frame switches that may be used in accordance with the present disclosure.

FIG. 2 is a diagram illustrating example IDR-frame and P-frame switches that may be used in accordance with the present disclosure. In particular, the top portion of FIG. 2 depicts an example IDR-frame switch between a first segment 210 at a higher image quality rendition and a second segment 220 at a lower image quality rendition. As shown, segment 210 includes an IDR-frame 211, followed by a P-frame 212, B-frames 213 and 214, P-frame 215, B-frames 216 and 217, and P-frame 218. Additionally, segment 220 includes an IDR-frame 221, followed by a P-frame 222, B-frames 223 and 224, P-frame 225, B-frames 226 and 227, and P-frame 228. Thus, as shown in FIG. 2, a rendition switch between segments 210 and 220 occurs at IDR-frame 221, which is the first frame of segment 220. Additionally, the bottom portion of FIG. 2 depicts an example P-frame switch between a first segment 230 at a higher image quality rendition and a second segment 240 at a lower image quality rendition. As shown, segment 230 includes an IDR-frame 231, followed by a P-frame 232, and B-frames 233 and 234. Additionally, segment 240 includes a P-frame 241, B-frames 242 and 243, and P-frame 244. Thus, as shown in FIG. 2, a rendition switch between segments 230 and 240 occurs at P-frame 241, which is the first frame of segment 240. It is noted that any or all of segments 210, 220, 230 and 240 may also be referred to as portions, as they constitute a portions of a transmitted video stream. Accordingly, as shown in FIG. 2, the ability to switch renditions at P-frames may serve to reduce segment duration without requiring more frequent transmission of IDR-frames. For example, segments 230 and 240 both include fewer frames and have shorter duration than segments 210 and 220. In some examples, each of segments 210, 220, 230, and 240 may be requested by a recipient along with an indication of the particular rendition that is selected for receiving the respective segment. In some cases, segments may be requested using a request that corresponds to a particular protocol in which the video stream is transmitted. For example, if a video stream is being transmitted using HTTP protocol, than segments 210, 220, 230, and 240 may be requested using an HTTP request.

Figure 3:
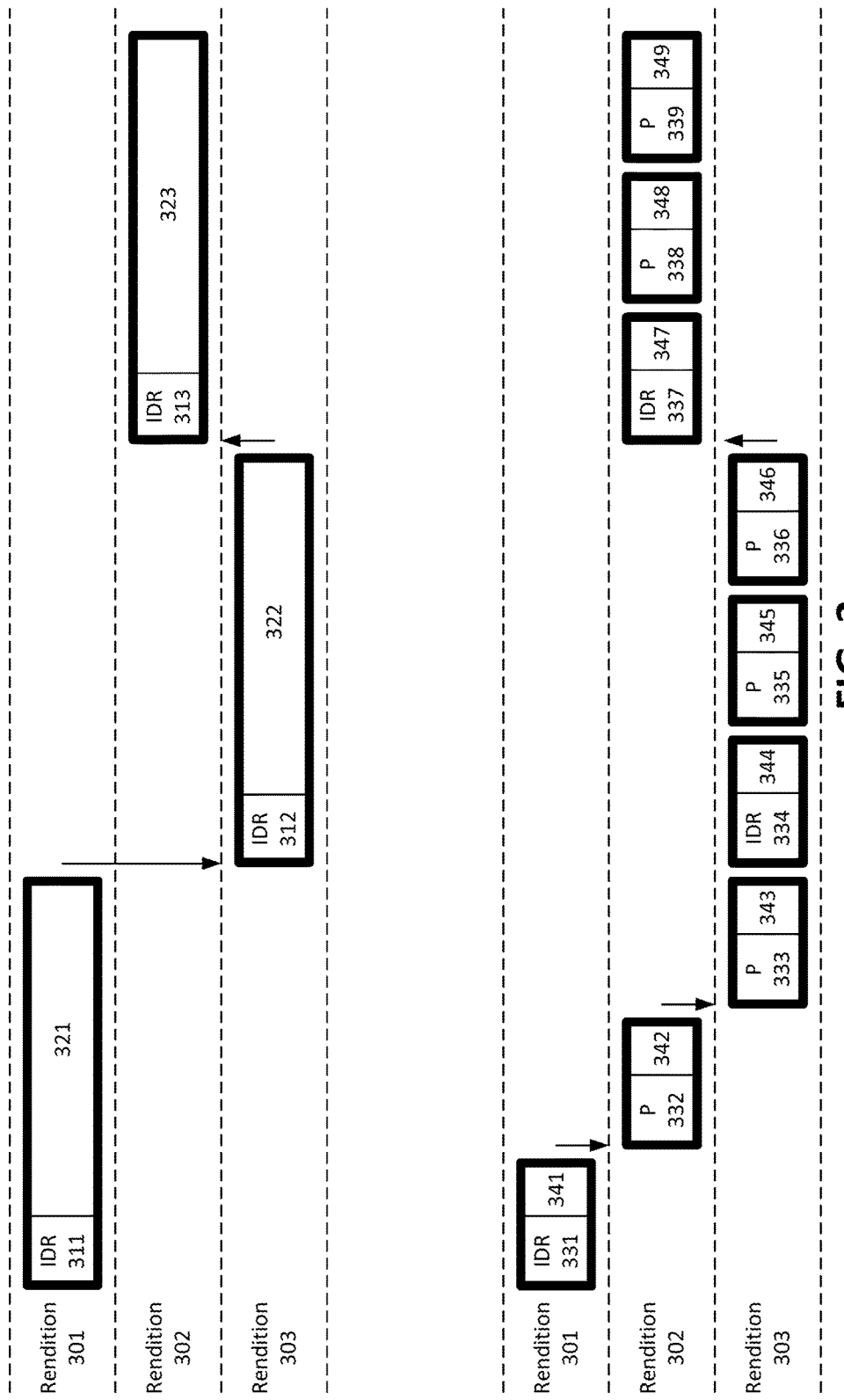
FIG. 3 is a diagram illustrating example IDR-frame only switching and combined IDR-frame and P-frame switching that may be used in accordance with the present disclosure.

In some examples, rendition switching at P-frames may be employed for a transmission only when a switched-to rendition has a lower image quality (e.g., lower bitrate, lower resolution, etc.) than a switched-from rendition, which may sometimes be referred to as switching down. Also, in some examples, rendition switching at IDR-frames may be employed for a transmission when a switched-to rendition has a lower image quality than a switched-from rendition and/or when a switched-to rendition has a higher image quality (e.g., higher bitrate, lower resolution, etc.) than a switched-from rendition, which may sometimes be referred to as switching up. Thus, in some examples, switching down may be accomplished using P-frame switching, IDR-frame switching or both. By contrast, in some examples, switching up may be accomplished using only IDR-frame switching. The technique of switching down at P-frames and/or IDR-frames and switching up only at IDR-frames is referred to hereinafter as combined IDR-frame and P-frame switching. Referring now to FIG. 3, some examples of combined IDR-frame and P-frame switching in comparison to IDR-frame only switching will now be described in detail.

As shown, the top portion of FIG. 3 depicts example IDR-frame only switching, such as may be employed in conventional adaptive bitrate streaming techniques. In the example of FIG. 3, a video stream is encoded into three renditions 301, 302 and 303. In the example of FIG. 3, the IDR-frame only switching is initiated with a transmission of a first segment 321 that is encoded using rendition 301. Segment 321 starts with an IDR-frame 311. Subsequent to segment 321, the video stream is switched down to rendition 303 (as shown by the downward arrow subsequent to segment 321). The next segment 322 is, therefore, encoded using rendition 303. Segment 322 starts with an IDR-frame 312. Subsequent to segment 322, the video stream is switched up to rendition 302 (as shown by the upward arrow subsequent to segment 322). The next segment 323 is, therefore, encoded using rendition 302. Segment 323 starts with an IDR-frame 313.

The bottom portion of FIG. 3 depicts example combined IDR-frame and P-frame switching. In the example of FIG. 3, the combined IDR-frame and P-frame switching is initiated with a transmission of a first segment 341 that is encoded using rendition 301. Segment 321 starts with an IDR-frame 331. Subsequent to segment 341, the video stream is switched down to rendition 302. The next segment 342 is, therefore, encoded using rendition 302. Segment 342 starts with a P-frame 332. Subsequent to segment 342, the video stream is again switched down to rendition 303. The next segment 343 is, therefore, encoded using rendition 303. Segment 343 also starts with a P-frame 333. Segments 344, 345, and 346 are then transmitted without switching between renditions. Segment 344 starts with IDR-frame 334. Segment 345 starts with P-frame 335. Segment 346 starts with P-frame 336. Subsequent to segment 346, the video stream is switched up to rendition 302. The next segment 347 is, therefore, encoded using rendition 302. As should be appreciated, in this example, because the video stream is switched up to a higher quality rendition, IDR-frame switching is employed. Accordingly, in this example, segment 347 starts with an IDR-frame 337. Segments 348 and 349 are then transmitted without switching between renditions. Segment 348 starts with P-frame 338. Segment 349 starts with P-frame 339. It is noted that there is no requirement that switching up or switching down must go from one rendition to an immediate higher or lower rendition. For example, although not shown in FIG. 3, a transmission may be switched down directly from rendition 301 to rendition 303 or may be switched up directly from rendition 303 to rendition 301.

In some cases, switching down at P-frames and/or IDR-frames and switching up only at IDR-frames may provide a number of advantages. For example, in some cases, switching down at P-frames may allow reduction of end-to-end latency as well and more frequent and responsive switching when transmission characteristics are becoming less favorable. In particular, as shown in FIG. 3, it can be seen that, during the duration in which segment 321 is transmitted using the IDR-frame only switching technique, three separate segments 341, 342, and 343 are transmitted by allowing switching down at P-frames 332 and 333. Accordingly, in this example, it can be seen that P-frame down-switching may allow end-to-end latency to be reduced (in comparison to IDR fame only switching) by reducing segment duration and allowing three segments (i.e., segments 341, 342, and 343) to be transmitted in the same duration as a single segment 321. Additionally, in this example, it can be seen that P-frame down-switching has allowed a more rapid down-switch (in comparison to IDR fame only switching) from rendition 301 to rendition 302 and, subsequently, to rendition 303. More specifically, it is seen that P-frame down-switching allows down-switches to both rendition 302 (i.e., at P-frame 332) and rendition 303 (i.e., at P-frame 333) before the IDR-frame only switching technique is able to make even a single down-switch from first segment 321. This more rapid and responsive switching may, in some cases, be particularly advantageous when transmission characteristics are becoming less favorable. This is because the less favorable transmission characteristics may not be capable of effectively supporting transmission of a current rendition that has too high of an image quality, thereby causing undesirable deterioration in playback conditions. It is noted, however, that, in some cases, a determination may be made to switch down to a lower quality rendition at a point in the transmission stream at which a next IDR-frame is closer than (e.g., will be transmitted and/or received prior to) a next P-frame. In these scenarios, it may sometimes be more advantageous to switch down at the next IDR-frame as opposed to waiting longer to switch down at the next P-frame, and IDR-frame switching may therefore be employed. Thus, although FIG. 3 depicts some particular examples in which a transmission is switched down to a lower image quality rendition at P-frames, it is noted that switching may also sometimes be performed at IDR-frames.

By contrast, switching up may occur in response to transmission characteristics that are becoming more favorable. Thus, when switching up, there is no (or little) concern that changing transmission characteristics will not support the transmission of a current rendition image quality. Accordingly, when switching up, the benefits of more rapid and responsive switching may sometimes be reduced in comparison to those benefits when switching down, and a more conservative approach may be employed. Therefore, when switching up, it may sometimes be advantageous to forgo the rapid response of P-frame switching in order to benefit from the clean switching characteristics of IDR-frames.

As set forth above, in some examples, not all P-frames may support rendition switching. For example, in some cases, a special type of P-frame (referred to hereinafter as a P-switch frame) may be designated as a P-frame that supports rendition switching. By contrast, other P-frames (referred to hereinafter as a non-switch P-frames) may not support rendition switching. In some examples, a designation of a particular frame as a P-switch frame may be performed using various techniques. For example, in some cases, a P-switch frame may be indicated in a transmitted bit stream. In some examples, a P-switch frame may be indicated in a transmitted bit stream using a network abstraction layer (NAL) header. Specifically, the NAL header may include a frame type field or other indication that indicates that a respective frame is a P-frame that supports rendition switching (i.e., is a P-switch frame). Also, in some examples, a supplemental enhancement information (SEI) message that precedes a P-switch frame in a bit stream may indicate that the P-switch frame supports rendition switching. Additionally, in some cases, a sequence parameter set (SPS) may be placed before a P-switch frame in a bit stream to indicate a respective resolution and/or other respective attributes of the P-switch frame.

Figure 4:
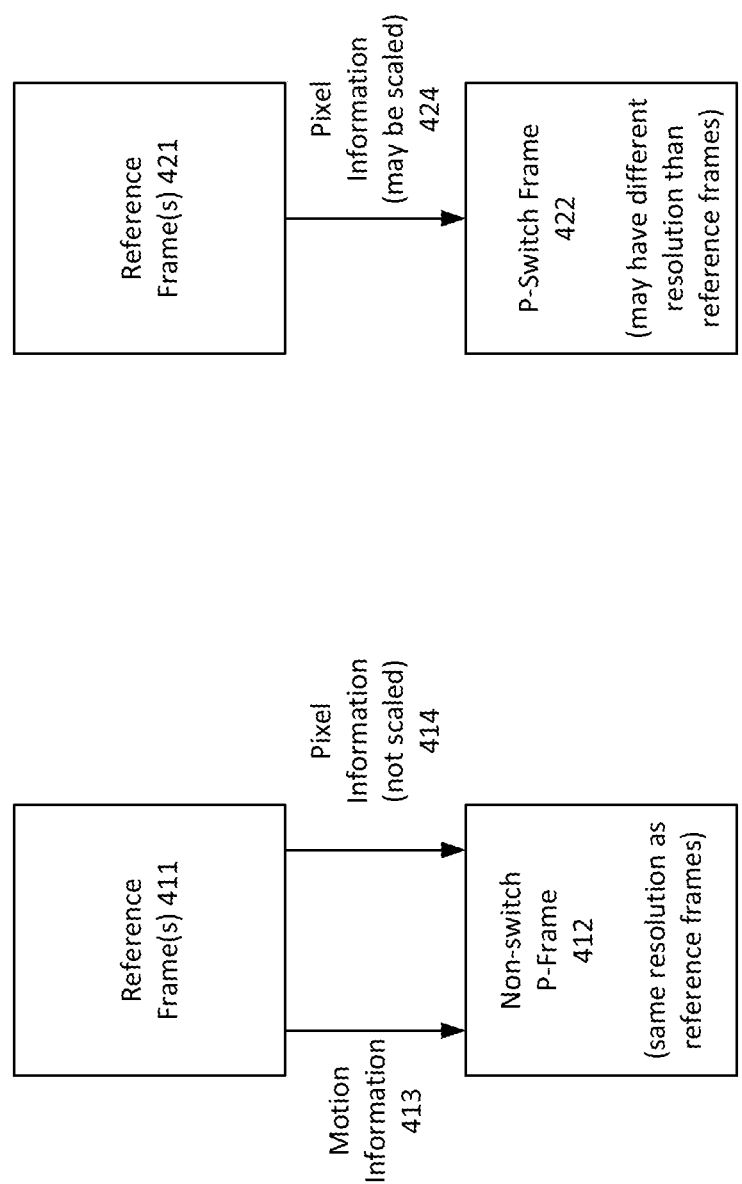
FIG. 4 is a diagram illustrating example characteristics of non-switch P-frames and P-switch frames that may be used in accordance with the present disclosure.

In some examples, to allow for efficient rendition switching, P-switch frames may differ from non-switch P-frames based on various characteristics. FIG. 4 is a diagram illustrating example characteristics of non-switch P-frames and P-switch frames that may be used in accordance with the present disclosure. As shown in FIG. 4, an example non-switch P-frame 412 is generated based, at least in part, on information from one or more respective reference frames 411. For non-switch P-frame 412, its reference frame(s) 411 will always be transmitted as part of the same rendition as the non-switch P-frame 412. Accordingly, reference frame(s) 411 will always have the same resolution as non-switch P-frame 412. This is indicated in FIG. 4 by the words "same resolution as reference frames" included within non-switch P-frame 412. As shown in FIG. 4, non-switch P-frame 412 may be generated based on motion information 413 from its reference frame(s) 411. Motion information 413 may include, for example, information associated with motion compensation with respect to reference frame(s) 411, such as motion displacement vectors with respect to reference frame(s) 411, marcroblock partition information, and other information. Non-switch P-frame 412 is generated based on pixel information 414, such as pixel value data, from reference frame(s) 411. It is noted that, because non-switch P-frame 412 will always have the same resolution as its reference frame(s) 411, there is no need to scale pixel information from reference frame(s) 411 for use in generating non-switch P-frame 412. This is indicated in FIG. 4 by the words "not scaled" that are displayed adjacent to pixel information 414.

As also shown in FIG. 4, an example P-switch frame 422 is generated based, at least in part, on information from one or more respective reference frames 421. For P-switch frame 422, its reference frame(s) 421 may be transmitted as part of a different rendition than the P-switch frame 422. Accordingly, reference frame(s) 421 may have a different resolution than P-switch frame 422. This is indicated in FIG. 4 by the words "may have different resolution than reference frames" included within P-switch frame 422. Because P-switch frame 422 may be included in a different rendition than reference frame(s) 421, motion information from reference frame(s) 421 may be invalid and may cause distortion if applied to the P-switch frame 422. Accordingly, in the example of FIG. 4, while motion information 413 from reference frame(s) 411 is used to generate non-switch P-frame 412, motion information from reference frames 421 is prohibited from being used to generate P-switch frame 422 and is therefore not shown in FIG. 4. Also, in the example of FIG. 4, P-switch frame 422 is generated based on pixel information 424, such as pixel value data, from reference frame(s) 421. However, because P-switch frame 422 may have a different resolution than reference frame(s) 421, the pixel information from reference frame(s) 421 may be scaled for use in generating P-switch frame 422. This is indicated in FIG. 4 by the words "may be scaled" that are displayed adjacent to pixel information 414.

In particular, for cases in which P-frame switching is employed when switching down in image quality (e.g., as shown in FIG. 3), the reference frame(s) 421 may have a higher resolution than P-switch frame 422 and the pixel information 414 from reference frame(s) 421 may be downscaled for use in generating P-switch frame 422. A variety of different techniques may be employed for downscaling of pixel information from reference frame(s) 421. In one particular example, if the resolution of P-switch frame 422 is approximately half of the resolution of reference frame(s) 421, than the pixel information may be downscaled by, for example, selecting alternating pixels in the reference frame(s) 421 and generating pixel information 424 based on the selected alternating pixels. In other examples, more complex scaling algorithms may be employed, such as algorithms that may use of a selected portion (e.g., a selected percent or proportion) of pixel information from various pixels within the reference frames 421.

Figure 5:
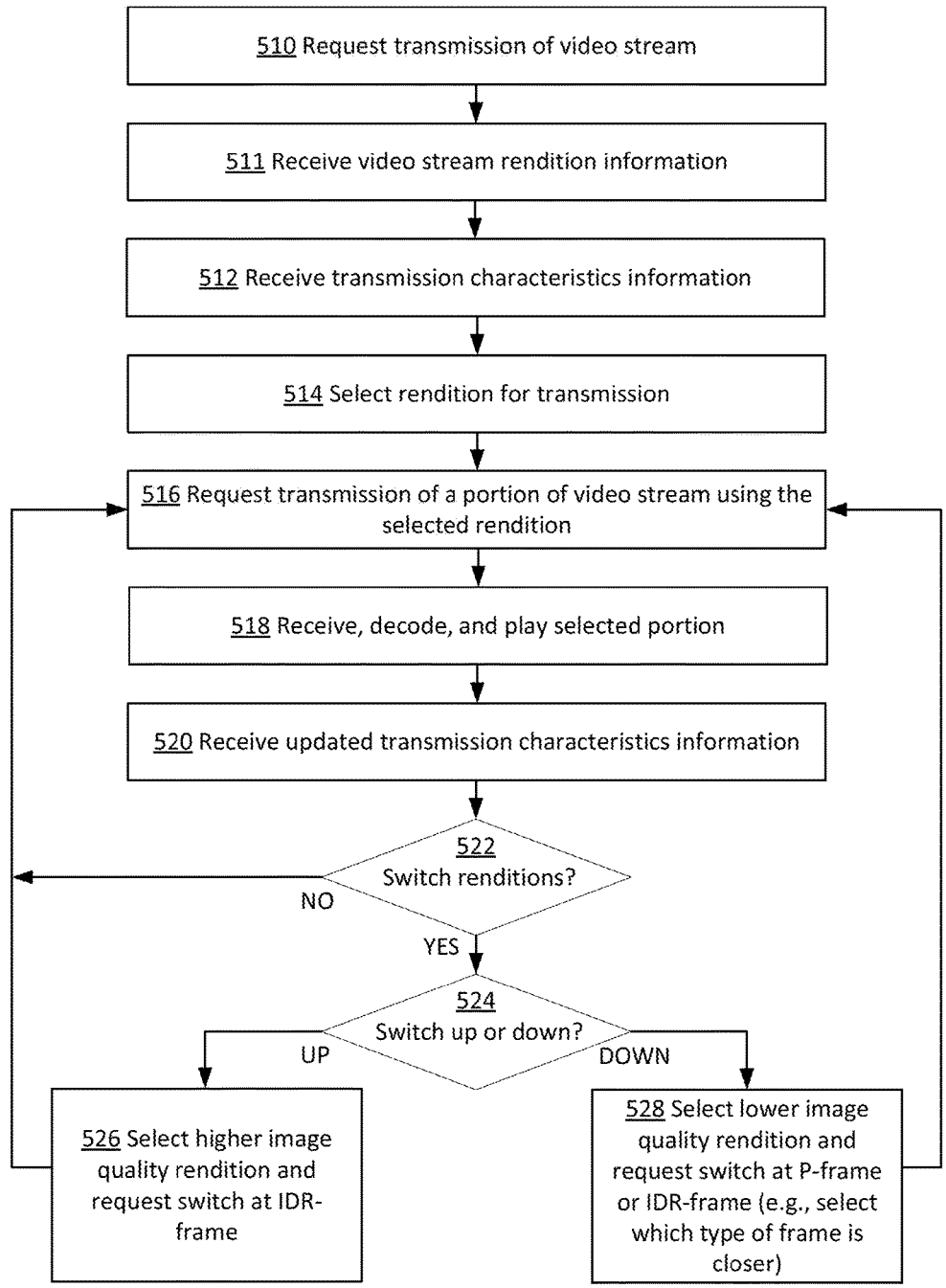
FIG. 5 is a flowchart illustrating a first example process for improved rendition switching for adaptive bitrate streaming that may be used in accordance with the present disclosure.

FIG. 5 is a flowchart illustrating a first example process for improved rendition switching for adaptive bitrate streaming that may be used in accordance with the present disclosure. In some examples, the process of FIG. 5 may be performed by a recipient (e.g., client) that receives a video streaming transmission, such as recipients 130A-N of FIG. 1. The process of FIG. 5 begins at operation 510, at which transmission of a video stream is requested. For example, a recipient, such as recipient 130A of FIG. 1, may issue a request to a transmitter (e.g., server), such as transmitter 100 of FIG. 1, for transmission of a video stream, such as video stream 120 of FIG. 1. In some examples, the transmission of the video stream may be requested as part of a broadcast to multiple recipients, such as a large-scale video broadcast. As set forth above, the requested video stream is transmitted using adaptive bitrate streaming techniques, in which the video stream is encoded using a plurality of different renditions having different image qualities with respect to one another. The renditions may differ from one another with respect to one or more image quality-related attributes, such as bitrates, resolutions, profiles, frame rates, and others. For example, as shown in FIG. 1, video stream 120 is encoded into three renditions 121, 122, and 123. In some examples, video stream rendition information may be received, for example from a server or other transmitter, that may include an indication of available renditions into which the video stream is encoded as well as indications of the respective characteristics (e.g., bitrates, resolutions, profiles, frame rates, and others) of each available rendition.

In some examples, the requested video stream may be transmitted using a communications protocol that is commonly employed for adaptive bitrate streaming, such as hypertext transfer protocol (HTTP).

At operation 512, transmission characteristics information is received. As set forth above, transmission characteristics may include characteristics associated with the transmission of a video stream, such as network conditions (e.g., available network bandwidth, throughput, etc.), computational resources (e.g., recipient processor usage, recipient memory usage, etc.), decoder compatibility, and others. For example, transmission characteristics information may be received by various transmission characteristics components, such as transmission characteristics information components 112 and 132A-N of FIG. 1.

At operation 514, a particular rendition is selected for transmission of the video stream. In some examples, the rendition may be selected based, at least in part, on transmission characteristics information. For example, in some cases, when transmission characteristics are generally more favorable (e.g., higher available network bandwidth, lower recipient CPU usage, etc.), a rendition with a generally higher image quality (e.g., higher bitrates, higher resolutions, etc.) may be selected. By contrast, in some cases, when transmission characteristics are generally less favorable (e.g., lower available network bandwidth, higher recipient CPU usage, etc.), a rendition with a generally lower image quality (e.g., higher bitrates, higher resolutions, etc.) may be selected.

At operation 516, transmission of a portion of a video stream is requested using the selected rendition. For example, a recipient may issue a request, such as an HTTP request, for a portion of the video stream (e.g., a segment of the video stream) to be transmitted using the selected rendition. At operation 518, the requested portion of the video stream is received, decoded, and played. For example, referring to FIG. 1, the requested portion of the video stream may be received by recipient 130A, decoded by decoder 131A, and played by playback components 133A, such as a media player, web browser, or other playback components.

At operation 520, updated transmission characteristics information is received. As set forth above, during the course of transmission of a video stream, one or more transmission characteristics may change relative to their prior state. For example, network conditions, such as available network bandwidth may change, for example when other network communications being received by the recipient are initiated, terminated, or otherwise modified. As another example, CPU usage by the recipient may change, for example when various processing tasks are initiated, terminated, or otherwise modified. In some examples, updated transmission characteristics information may be received by various transmission characteristics information components, such as transmission characteristics information components 112 and 132A-N of FIG. 1.

At operation 522, a determination is made as to whether to switch renditions for the transmission of the video stream. In some examples, the determination as to whether to switch renditions may be made based, at least in part, on updated transmission characteristics information. For example, in some cases, when transmission conditions generally remain stable, a determination may be made not to switch renditions. By contrast, when transmission characteristics are generally becoming more favorable (e.g., increasing available network bandwidth, decreasing recipient CPU usage, etc.), a switch to a rendition with a generally higher image quality (e.g., higher bitrates, higher resolutions, etc.) may sometimes be made. By contrast, when transmission characteristics are generally becoming less favorable (e.g., decreasing available network bandwidth, increasing recipient CPU usage, etc.), a switch to a rendition with a generally lower image quality (e.g., higher bitrates, higher resolutions, etc.) may sometimes be made.

If, at operation 522, a determination is made to not switch renditions, then the process may return to operation 516, at which transmission of a subsequent portion of the video stream is requested using the previously selected rendition. By contrast, if, at operation 522, a determination is made to switch renditions, then the process proceeds to operation 524, at which it is determined whether to switch up (i.e., switch to a rendition with a higher image quality) or switch down (i.e., switch to a rendition with a lower image quality), for example using the criteria described in the above paragraph.

If, at operation 524, a determination is made to switch-up to a higher image quality rendition, then at operation 526 a higher image quality rendition is selected and a request is issued to switch to the selected higher image quality rendition at an IDR-frame. For example, a recipient may issue a request, such as an HTTP request, for a portion of the video stream (e.g., a segment of the video stream) to be transmitted using the selected higher image quality rendition having an IDR-frame as its initial frame. As set forth above, in some examples, when switching up to a higher image quality rendition, there may be no (or little) concern that changing transmission characteristics will not support the transmission of a current rendition image quality. For these and other reasons, when switching up, it may sometimes be advantageous to forgo the rapid response of P-frame switching in order to benefit from the clean switching characteristics of IDR-frames.

If, at operation 524, a determination is made to switch-down to a lower image quality rendition, then at operation 528 a lower image quality rendition is selected and a request is issued to switch to the selected lower image quality rendition at a P-frame or at an IDR-frame. For example, a recipient may issue a request, such as an HTTP request, for a portion of the video stream to be transmitted using the selected lower image quality rendition having either a P-frame or an IDR-frame as its initial frame. The determination of whether to switch-down at a P-frame or at an IDR-frame may be based, at least in part, on which type of frame is closer. In some examples, for cases in which a next P-frame is closer than (e.g., will be transmitted and/or received prior to) a next IDR-frame, P-frame switching may be employed. By contrast, in some examples, for cases in which a next IDR-frame is closer than (e.g., will be transmitted and/or received prior to) a next P-frame, IDR-frame switching may be employed. As set forth above, in some examples, a determination to switch down to a lower image quality rendition may be based on deteriorating transmission characteristics that may not be capable of effectively supporting transmission of a current rendition that has too high of an image quality, thereby causing undesirable effects on playback conditions. For these and other reasons, when switching down, it may sometimes be advantageous to employ P-frame switching, which may allow for rapid and responsive rendition switching in cases where a next P-frame is received before a next IDR-frame. By contrast, in cases where a next IDR-frame is received before a next P-frame, IDR-frame switching may sometimes be employed.

Figure 6:
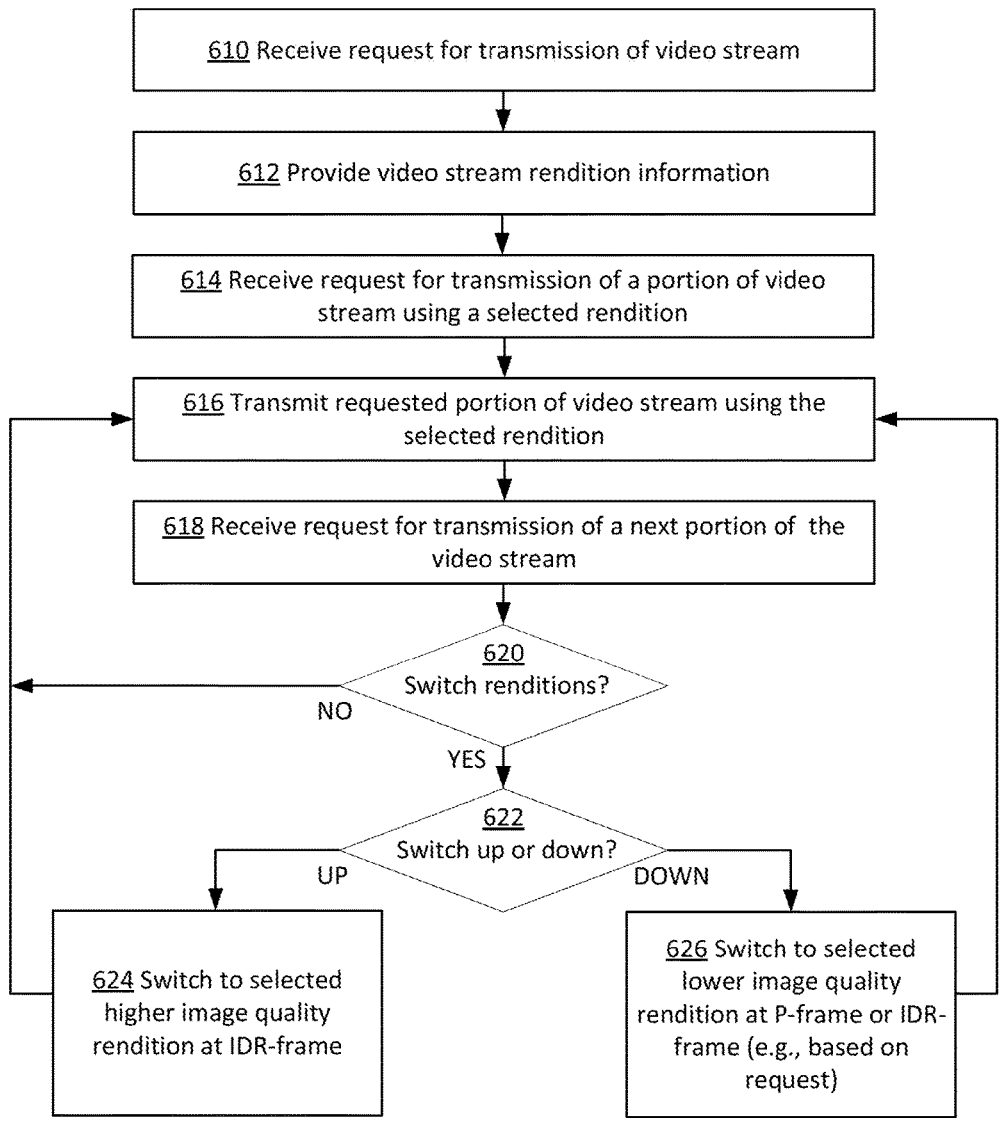
FIG. 6 is a flowchart illustrating a second example process for improved rendition switching for adaptive bitrate streaming that may be used in accordance with the present disclosure.

FIG. 6 is a flowchart illustrating a second example process for improved rendition switching for adaptive bitrate streaming that may be used in accordance with the present disclosure. In some examples, the process of FIG. 6 may be performed by one or more transmitters (e.g., one or more servers) that transmit a video stream, such as transmitter 100 of FIG. 1. The process of FIG. 6 begins at operation 610, at which encoding of a video stream for transmission is initiated. For example, a transmitter, such as transmitter 100 of FIG. 1, may encode a video stream for transmission to one or more recipients, such as recipients 130A-N of FIG. 1. In some examples, the transmission of the video stream may be requested as part of a broadcast to multiple recipients, such as a large-scale video broadcast. As set forth above, the encoded video stream is transmitted using adaptive bitrate streaming techniques, in which the video stream is encoded using a number of different renditions having different image qualities with respect to one another. For example, the renditions may differ from one another with respect to one or more image quality-related attributes, such as bitrates, resolutions, profiles, frame rates, and others. For example, as shown in FIG. 1, video stream 120 is encoded into three renditions 121, 122, and 123. In some examples, a transmitter may provide, to clients or other recipients, video stream rendition information indicating the available renditions as well as indications of the respective characteristics (e.g., bitrates, resolutions, profiles, frame rates, and others) of each available rendition.

In some examples, the requested video stream may be transmitted using a communications protocol that is commonly employed for adaptive bitrate streaming, such as hypertext transfer protocol (HTTP).

At operation 612, a request for transmission of a portion of the video stream to a first recipient using a selected rendition is received. As set forth above, in some examples, the requested rendition may be selected based, at least in part, on transmission characteristics information. For example, in some cases, when transmission characteristics are generally more favorable (e.g., higher available network bandwidth, lower recipient CPU usage, etc.), a rendition with a generally higher image quality (e.g., higher bitrates, higher resolutions, etc.) may be selected. By contrast, in some cases, when transmission characteristics are generally less favorable (e.g., lower available network bandwidth, higher recipient CPU usage, etc.), a rendition with a generally lower image quality (e.g., higher bitrates, higher resolutions, etc.) may be selected. At operation 614, the requested portion of the video stream is transmitted to the first recipient using the selected rendition.

At operation 616, a request for transmission of a next portion of the video stream to a first recipient using a selected rendition is received. At operation 618, it is determined whether the request received at operation 616 is a request to switch transmission of the video stream to the first recipient from one rendition to another. As set forth above, a determination as to whether to switch renditions may be made based, at least in part, on updated transmission characteristics information. For example, in some cases, when transmission conditions generally remain stable, a determination may be made not to switch renditions. By contrast, when transmission characteristics are generally becoming more favorable (e.g., increasing available network bandwidth, decreasing recipient CPU usage, etc.), a switch to a rendition with a generally higher image quality (e.g., higher bitrates, higher resolutions, etc.) may sometimes be made. By contrast, when transmission characteristics are generally becoming less favorable (e.g., decreasing available network bandwidth, increasing recipient CPU usage, etc.), a switch to a rendition with a generally lower image quality (e.g., higher bitrates, higher resolutions, etc.) may sometimes be made.

If the request received at operation 616 does not request a rendition switch, then the process returns to operation 614, at which the requested portion of the video stream is transmitted to the first recipient using the same rendition as was used in the prior iteration of operation 614. If, on the other hand, the request received at operation 616 does request a rendition switch, then the process proceeds to operation 620, at which it is determined whether a switch-up (i.e., switch to a rendition with a higher image quality) is requested or switch-down (i.e., switch to a rendition with a lower image quality) is requested.

If a switch-up is requested, then, at operation 622, transmission of the video stream to the first recipient is switched to the selected higher image quality rendition at an IDR-frame. The process may then return to operation 614, at which the requested portion of the video stream is transmitted to the first recipient using the selected higher image quality rendition, and, in this example, the requested portion of the video stream will have an IDR-frame as its initial frame.

If, on the other hand, a switch-down is requested, then, at operation 624, transmission of the video stream to the first recipient is switched to the selected lower image quality rendition at a P-frame or at an IDR-frame, for example based on the request received at operation 618. The process may then return to operation 614, at which the requested portion of the video stream is transmitted to the first recipient using the selected lower image quality rendition having either a P-frame or an IDR-frame as its initial frame. As set forth above, for cases in which P-frame switching is employed, the P-frame at which the transmission is switched to the lower quality image rendition may be a special type of frame that is designated to support P-frame switching, which is referred to herein as a P-switch frame. In some examples, unlike other P-frames (i.e., non-switch P-frames), a P-switch frame may be prohibited from being generated based on motion information from its reference frames. Additionally, in some examples, a P-switch frame may have reference frames that have a higher resolution than the P-switch frame, and the P-switch frame may, therefore, be generated at least in part by downscaling pixel information from the higher resolution of the reference frames to the lower resolution of the P-switch frame.

As also set forth above, in some examples, an indication that a P-frame supports rendition switching (i.e., is a P-switch frame) may be transmitted, for example in a bit stream that includes the P-switch frame. In some examples, a P-switch frame may be indicated using a transmitted network abstraction layer (NAL) header. Specifically, the NAL header may include a frame type field or other indication that indicates that a respective frame is a P-frame that supports rendition switching (i.e., is a P-switch frame). Also, in some examples, a supplemental enhancement information (SEI) message that precedes a P-switch frame in a bit stream may indicate that the P-switch frame supports rendition switching. Additionally, in some cases, a transmitted sequence parameter set (SPS) may be placed before a P-switch frame in a bit stream to indicate a respective resolution and/or other respective attributes of the P-switch frame.

Figure 7:
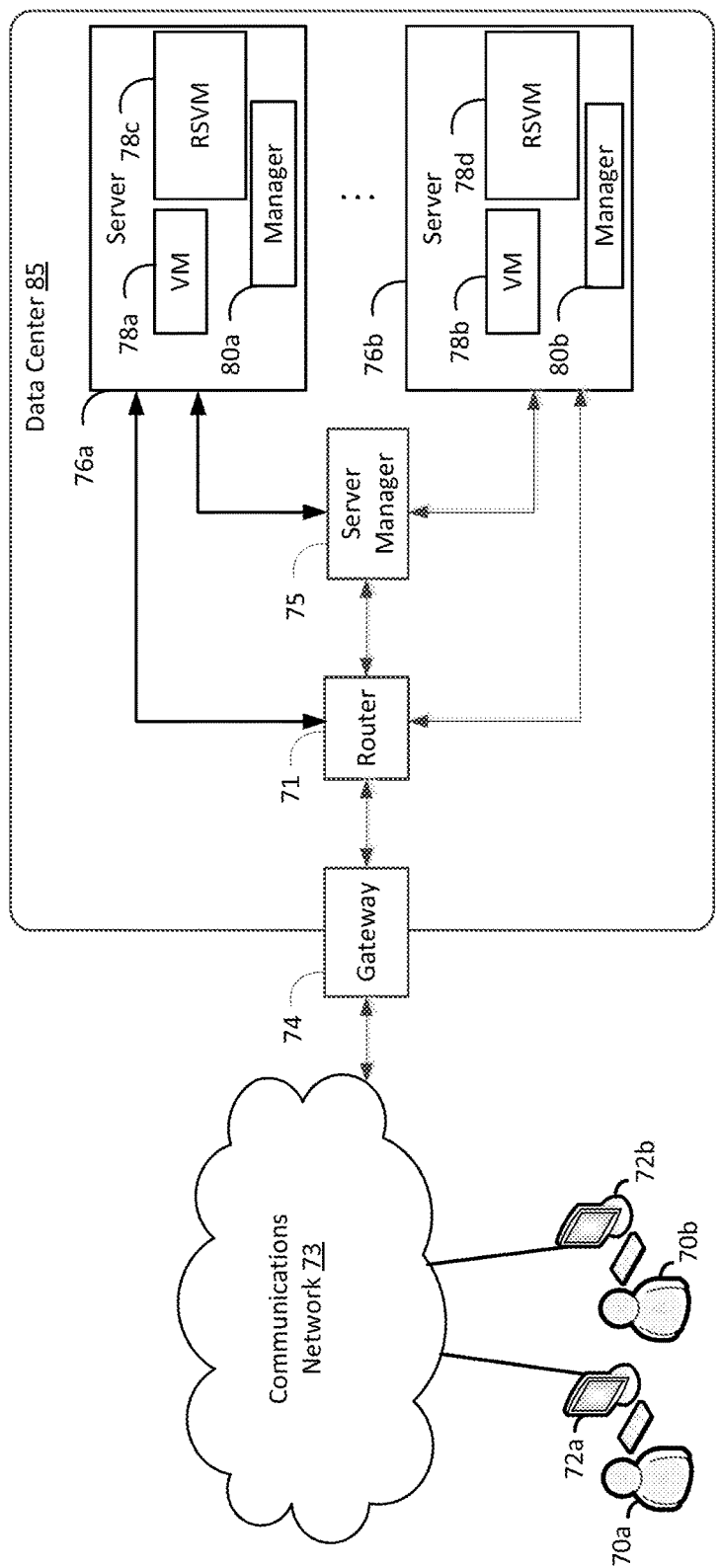
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
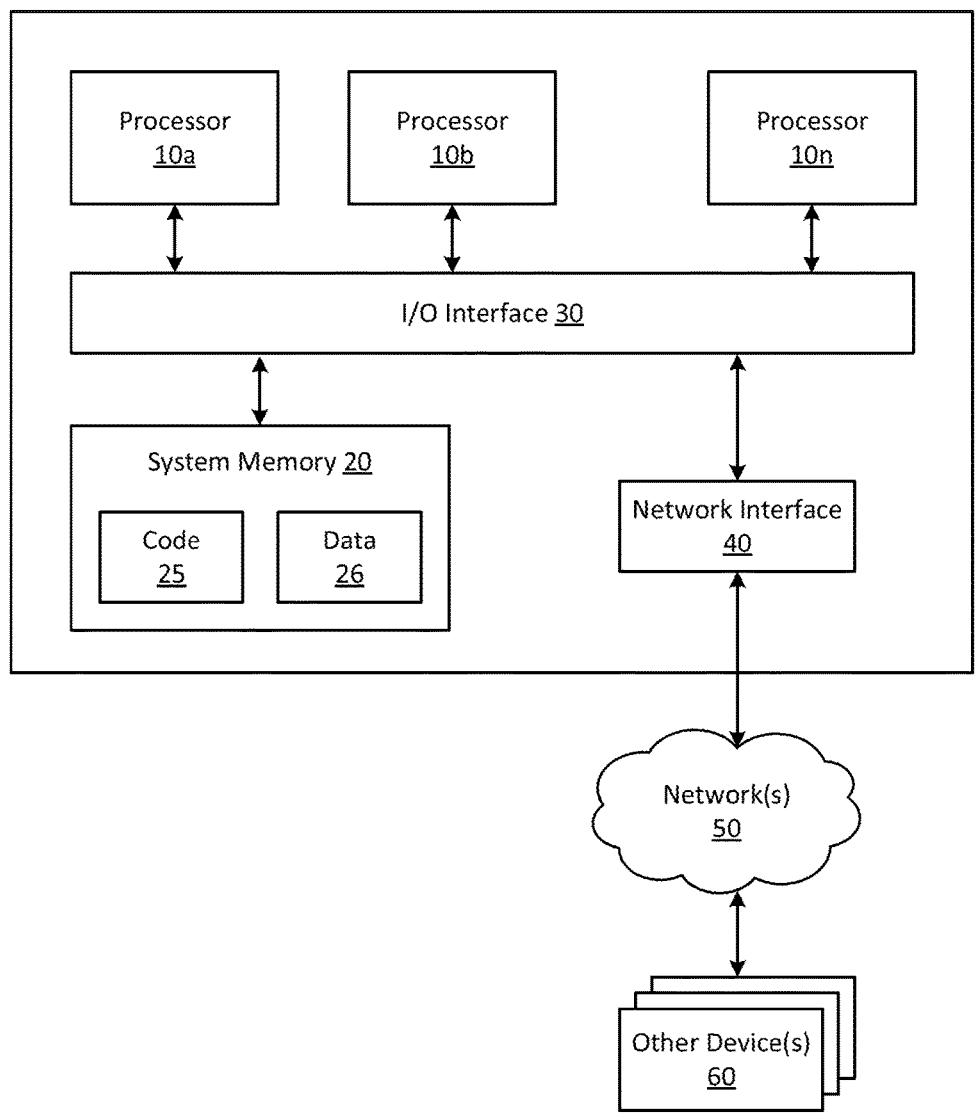
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for rendition switching of a video stream comprising:
   one or more processors; and
   one or more memories having stored therein instructions that, upon execution by the one or more processors, cause the computing system perform operations comprising:
      initiating encoding of a video stream for transmission using a plurality of renditions having different image qualities with respect to one another;
      transmitting a first portion of the video stream to a first recipient using a first rendition of the plurality of renditions;
      switching, at a predictive frame (P-Frame), transmission of the video stream to the first recipient from the first rendition to a second rendition of the plurality of renditions having a lower image quality than the first rendition, wherein the P-frame has one or more reference frames having a higher resolution than the P-frame, and wherein the P-frame is generated at least in part by downscaling pixel information from the higher resolution of the one or more reference frames to a lower resolution of the P-frame;
      transmitting a second portion of the video stream to the first recipient using the second rendition, wherein the P-Frame is an initial frame of the second portion of the video stream;
      switching, at an instantaneous decoder refresh frame (IDR-frame), transmission of the video stream to the first recipient from the second rendition to a third rendition having a higher image quality than the second rendition; and
      transmitting a third portion of the video stream to the first recipient using the third rendition, wherein the IDR-Frame is an initial frame of the third portion of the video stream.

2. The computing system of claim 1, wherein the system switches the transmission of the video stream between renditions at P-frames only when a switched-to rendition has a lower image quality than a switched-from rendition.

3. The computing system of claim 1, wherein the P-frame is prohibited from being generated based on motion information from the one or more reference frames.

4. The computing system of claim 1, wherein the transmission of the video stream is switched between renditions at IDR-frames when a switched-to rendition has a higher image quality than a switched-from rendition and when a switched-to rendition has a lower image quality than a switched-from rendition and a next IDR-frame is transmitted prior to a next P-frame.

5. The computing system of claim 1, further comprising transmitting at least one of a network abstraction layer (NAL) header or a supplemental enhancement information (SEI) message that indicates that the P-frame supports rendition switching.

6. The computing system of claim 1, further comprising transmitting a sequence parameter set (SPS) to indicate a resolution of the P-frame.

7. A computer-implemented method for rendition switching of a video stream comprising:

initiating encoding of a video stream for transmission using a plurality of renditions having different image qualities with respect to one another;

transmitting a first portion of the video stream to a first recipient using a first rendition of the plurality of renditions;

switching, at a predictive frame (P-Frame), transmission of the video stream to the first recipient from the first rendition to a second rendition of the plurality of renditions, wherein the P-frame has one or more reference frames having a higher resolution than the P-frame, and wherein the P-frame is generated at least in part by downscaling pixel information from the higher resolution of the one or more reference frames to a lower resolution of the P-frame; and transmitting a second portion of the video stream to the first recipient using the second rendition, wherein the P-Frame is an initial frame of the second portion of the video stream.

8. The computer-implemented method of claim 7, wherein the transmission of the video stream is switched between renditions at P-frames only when a switched-to rendition has a lower image quality than a switched-from rendition.

9. The computer-implemented method of claim 7, wherein the P-frame is prohibited from being generated based on motion information from the one or more reference frames.

10. The computer-implemented method of claim 7, wherein the second rendition has a lower image quality than the first rendition, and wherein the computer-implemented method further comprises:

switching, at an instantaneous decoder refresh frame (IDR-frame), transmission of the video stream to the first recipient from the second rendition to a third rendition having a higher image quality than the second rendition; and transmitting a third portion of the video stream to the first recipient using the third rendition, wherein the IDR-Frame is an initial frame of the third portion of the video stream.

11. The computer-implemented method of claim 10, wherein the transmission of the video stream is switched between renditions at IDR-frames when a switched-to rendition has a higher image quality than a switched-from rendition and when a switched-to rendition has a lower image quality than a switched-from rendition and a next IDR-frame is transmitted prior to a next P-frame.

12. The computer-implemented method of claim 7, further comprising transmitting at least one of a network abstraction layer (NAL) header or a supplemental enhancement information (SEI) message that indicates that the P-frame supports rendition switching.

13. The computer-implemented method of claim 7, further comprising transmitting a sequence parameter set (SPS) to indicate a resolution of the P-frame.

14. One or more non-transitory computer-readable storage media having stored thereon instructions that, upon execution by one or more compute nodes, cause the one or more compute nodes to perform operations comprising:

requesting transmission of a video stream, wherein the video stream is encoded in a plurality of renditions having different image qualities with respect to one another;

receiving a first portion of the video stream transmitted using a first rendition of the plurality of renditions;

requesting switching, at a predictive frame (P-Frame), of the transmission of the video stream from the first rendition to a second rendition of the plurality of renditions, wherein the P-frame has one or more reference frames having a higher resolution than the P-frame, and wherein the P-frame is generated at least in part by downscaling pixel information from the higher resolution of the one or more reference frames to a lower resolution of the P-frame; and receiving a second portion of the video stream transmitted using the second rendition, wherein the P-frame is an initial frame of the second portion of the video stream.

15. The one or more non-transitory computer-readable storage media of claim 14, wherein the transmission of the video stream is switched between renditions at P-frames only when a switched-to rendition has a lower image quality than a switched-from rendition.

16. The one or more non-transitory computer-readable storage media of claim 14, wherein the P-frame is prohibited from being generated based on motion information from the one or more reference frames.

17. The one or more non-transitory computer-readable storage media of claim 14, wherein the second rendition has a lower image quality than the first rendition, and wherein the operations further comprise:

requesting switching, at an instantaneous decoder refresh frame (IDR-frame), of transmission of the video stream from the second rendition to a third rendition having a higher image quality than the second rendition; and receiving a third portion of the video stream transmitted using the third rendition, wherein the IDR-Frame is an initial frame of the third portion of the video stream.

18. The one or more non-transitory computer-readable storage media of claim 17, wherein the transmission of the video stream is switched between renditions at IDR-frames when a switched-to rendition has a higher image quality than a switched-from rendition and when a switched-to rendition has a lower image quality than a switched-from rendition and a next IDR-frame is received prior to a next P-frame.

19. The one or more non-transitory computer-readable storage media of claim 14, wherein the operations further comprise receiving at least one of a network abstraction layer (NAL) header or a supplemental enhancement information (SEI) message that indicates that the P-frame supports rendition switching.

20. The one or more non-transitory computer-readable storage media of claim 14, wherein the operations further comprise receiving a sequence parameter set (SPS) that indicates a resolution of the P-frame.

* * * * *